Aug. 21, 1934.    H. H. SHELDON ET AL    1,971,317
APPARATUS AND METHOD FOR THE COMPARISON OF COLORS
Filed July 6, 1931    4 Sheets-Sheet 1
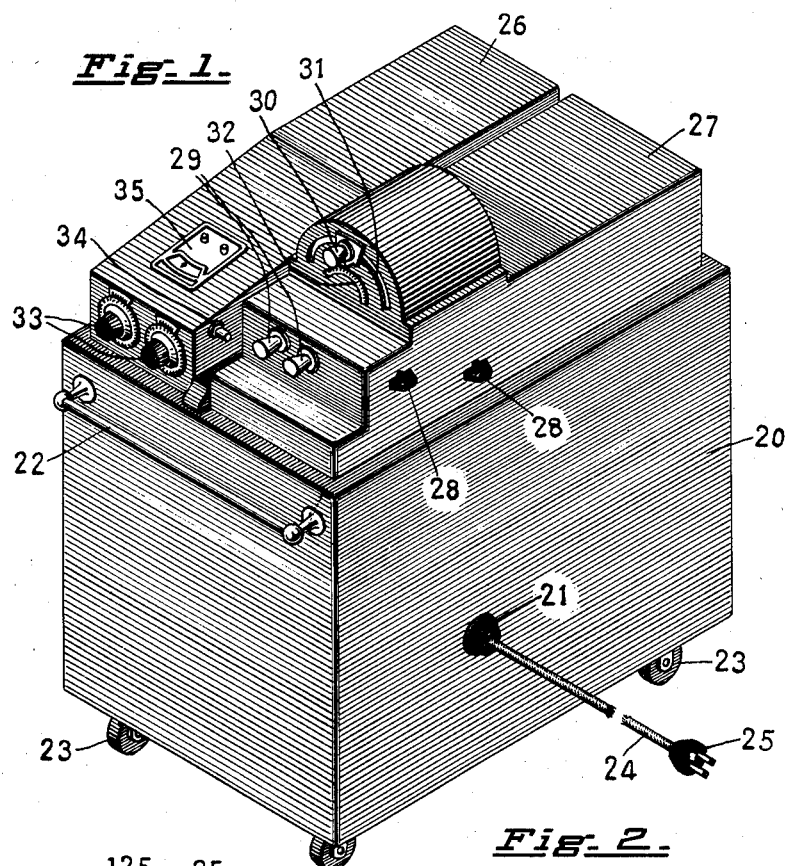
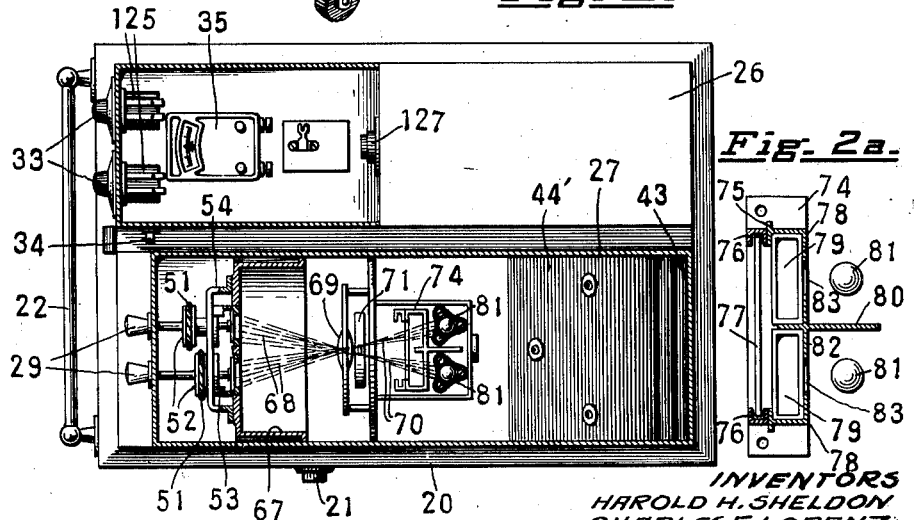

Aug. 21, 1934. H. H. SHELDON ET AL 1,971,317
APPARATUS AND METHOD FOR THE COMPARISON OF COLORS
Filed July 6, 1931   4 Sheets-Sheet 2
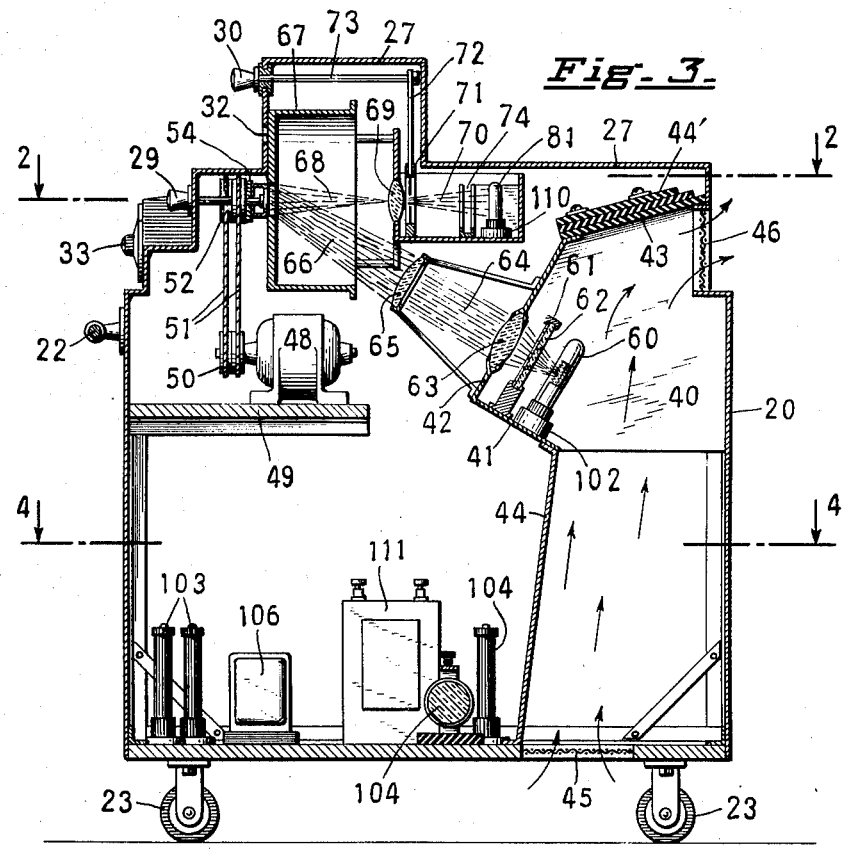
Fig. 3.
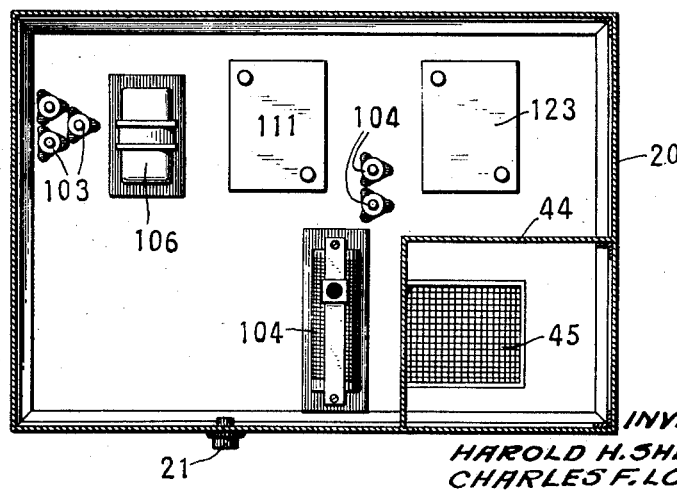
Fig. 4.
INVENTORS
HAROLD H. SHELDON
CHARLES F. LORENZ
ATTORNEY Aug. 21, 1934.   H. H. SHELDON ET AL   1,971,317
APPARATUS AND METHOD FOR THE COMPARISON OF COLORS
Filed July 6, 1931   4 Sheets-Sheet 3
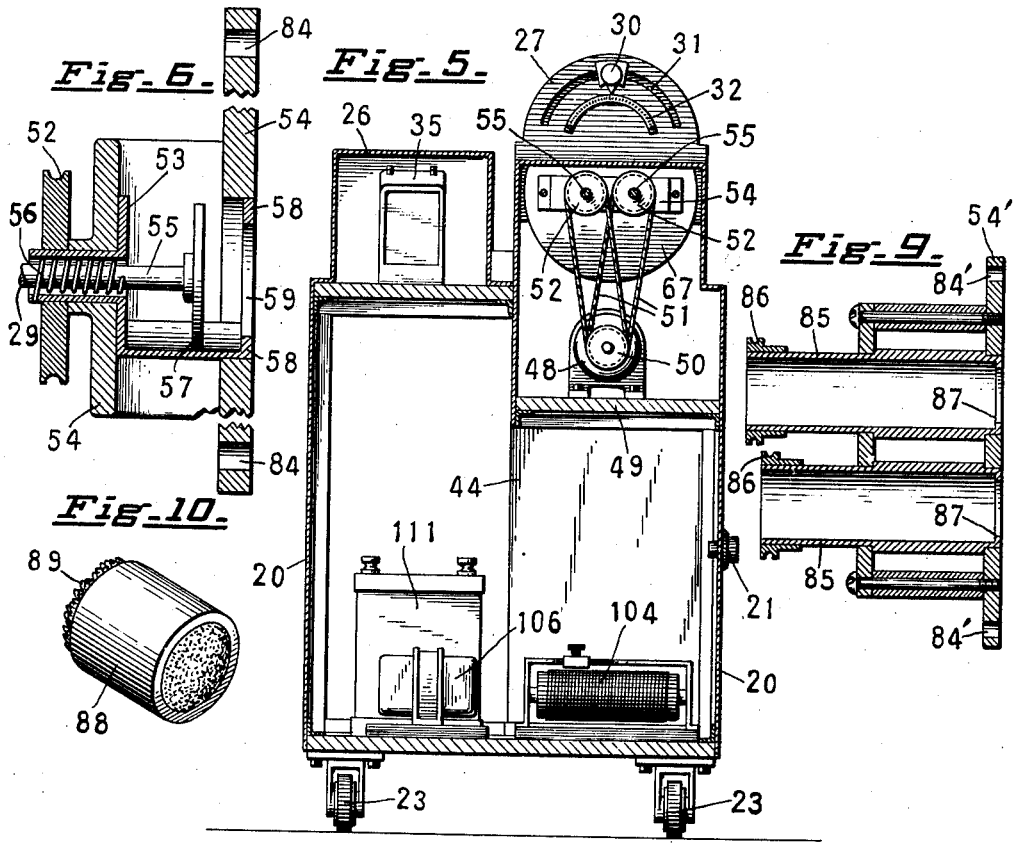
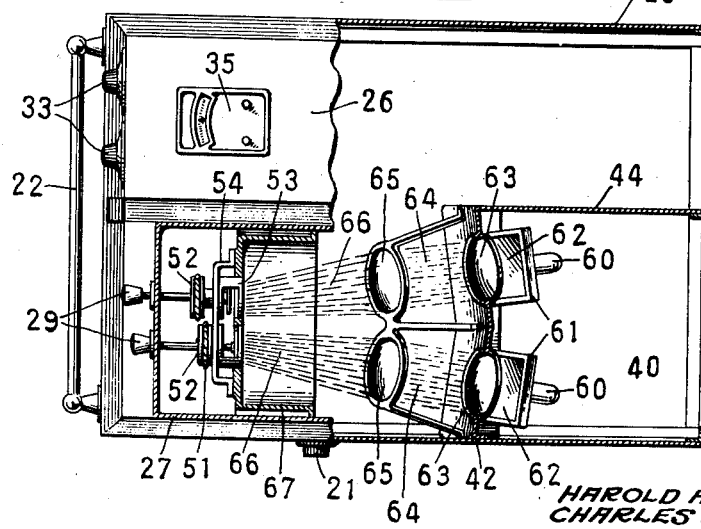
INVENTORS
HAROLD H. SHELDON
CHARLES F. LORENZ
BY
ATTORNEY

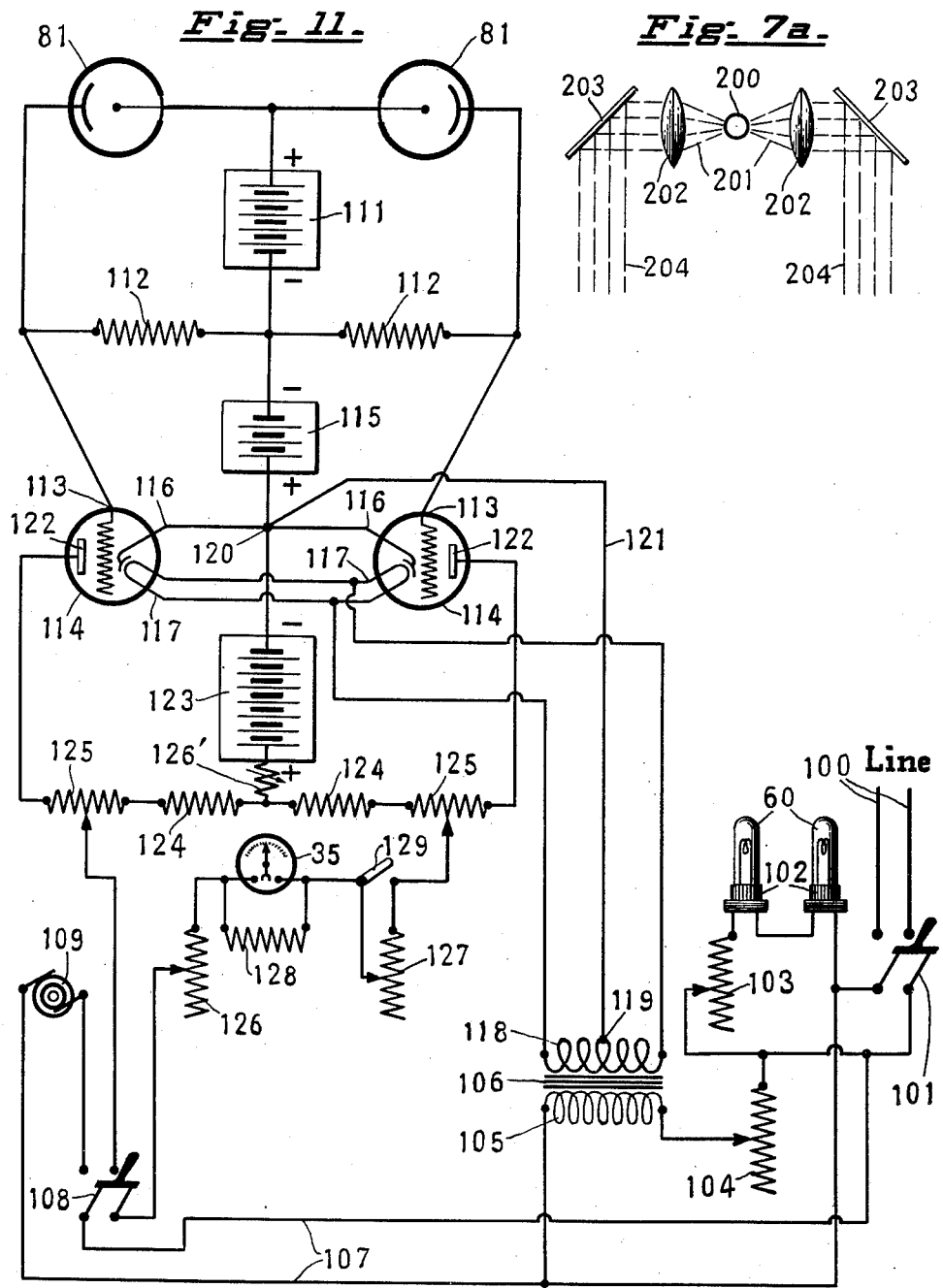

Patented Aug. 21, 1934

1,971,317

UNITED STATES PATENT OFFICE

1,971,317
APPARATUS AND METHOD FOR THE COMPARISON OF COLORS

Harold Horton Sheldon, Yonkers, N. Y., and Charles F. Lorenz, East Orange, N. J., assignors to Sheldon Electric Corporation, New York, N. Y., a corporation of New York Application July 6, 1931, Serial No. 548,976

8 Claims. (Cl. 88—14)

This invention relates in general to a method and means for the comparison of materials in respect to their color, shade and similar characteristics; for example, to determine the brighter or darker of two samples of material, either in a solid, liquid or gaseous state.

This invention relates more particularly to a commercial form of apparatus for the accomplishment of these purposes with a minimum of skill required from the operator thereof.

Broadly speaking this invention utilizes photoelectric cells, light sources to excite them, and sample comparing means to modify the degree of excitation.

One object of this invention is to provide a sensitive and yet rapid method of comparison which can be readily applied to commercial samples of materials.

Another object of this invention is to allow given light sources and given photo-electric cells to be employed with samples reflecting or transmitting light over a wide range of intensity.

The invention purposes to allow the uniform and easy control of the light energy reaching a plurality of photo-electric cells over a plurality of paths, which it does by merging said paths at the spot where said control is exercised.

Another object is to quickly and easily compensate for inequalities in the optical, physical and electrical portions of a plurality of paths in color matching apparatus.

A further object is the provision of electrical balancing networks to automatically compensate for ordinary fluctuations of electrical energy obtained from commercial supply lines.

Another object is to provide an apparatus in accordance with a system of this character by which various materials may be readily compared with similar materials of a standard color or shade. It embodies means allowing the employment of a plurality of light sources with automatic compensation for fluctuations in the energy supplying these light sources. In addition this apparatus makes provision for the comparison of surfaces, as well as the intensity of colored liquids or solutions of solids, such as dye stuffs, in a liquid. It is also readily adaptable to the comparison of oils in respect to their clarity, and to the comparison of samples of colored gases. Transparent or translucent solids may also be compared by means of it.

This invention embodies improved methods and apparatus for the foregoing purposes. It includes and elaborates certain of the methods and means disclosed in the U. S. Patent 1,834,905 issued to H. H. Sheldon.

In the form shown the operation of this invention depends upon the use of photo-electric cells in a balanced bridge circuit.

The arrangement of parts and their respective functions in this invention will be more clearly evident by reference to the following drawings where:

Fig. 1 is a perspective view of the exterior of an apparatus according to this invention.

Fig. 2 is a horizontal section of the apparatus on planes indicated at 2—2 of Fig. 3.

Fig. 2A is a detail of the light sensitive cells with their associated filter holder and liquid or gas holders.

Fig. 3 is a sectional elevation of one side.

Fig. 4 is a horizontal section on the plane 4—4 of Fig. 3.

Fig. 5 is an end elevation, partly in section.

Fig. 6 is a detail of one form of sample holder.

Fig. 7 is an irregular horizontal section of a portion of the optical system.

Fig. 7A shows an alternative light source system employing a single lamp.

Fig. 8 is a detail of one form of cell for containing liquids.

Fig. 9 shows an alternative form of sample holder for solids.

Fig. 10 shows an auxiliary sleeve containing a sample, as used with the holder of Fig. 9.

Fig. 11 is a schematic diagram of one type of electrical circuit for this invention.

Referring now particularly to Figs. 1, 2 and 3, 20 is the outside casing, preferably of heat resisting metal, provided with bushing 21 for the admission of an electrical cable 24 and plug 25 supplying electric energy thereto. Guard rail 22 serves as a protection to the controls and casters 23 allow the movement of the apparatus from spot to spot, as may be required.

Removable covers 26 and 27 allow access to the interior of the upper portion of the apparatus and are preferably also of metal or other heat resistant material.

At 28 are shown buttons operating electric switches, as later described. 29 represents the projecting handles controlling the sample holders.

At 30 is shown one adjustment for light intensity in the form of a handle. It moves in slot 31 and indicates upon scale 32 which is preferably fastened to chamber 67. 33 represents the exterior controls of the electrical balancing circuits. 34 is the "duller" switch control handle, serving to reduce sensitivity during preliminary adjustments and 35 is the indicating galvanometer.

Light source chamber 40 is separated from the other cavities of the apparatus by walls shown at 41, 42, 43 and 44, which walls are preferably of metal with heat insulating material such as asbestos covering the outer surface thereof, especially the upper walls, as indicated at 44'. This is to minimize heat transfer to the other parts of the apparatus. Cooling of this chamber is facilitated by screened openings 45 at the bottom, and 46 at the top which allow air to circulate through the chamber by natural convection currents, as indicated by the arrows in Fig. 3.

Referring now in addition to Figs. 5 and 6, the method of rotation employed for solid samples is shown in greater detail. A motor 48 mounted on a projecting shelf 49 carries a double pulley 50 which by means of belts 51 drives two upper pulleys 52. The rotation may be in the same direction, as indicated, or by crossing one belt opposite rotation is readily secured, if so desired.

Pulleys 52 serve to revolve metal frameworks 53 which rotate in suitable bearings in a fixed framework 54, having openings 84 for fastening to chamber 67 by screws or other suitable means. Frameworks 53 have their shaft portions hollow and containing inner shafts 55, rotating therewith. These shafts are capable of longitudinal motion against the tension of springs 56, and bear at one extremity handles 29 and at the other discs 57 which seat against rims 58 of the frameworks 53, thus holding the samples, which are in the form of discs, so that uniform surfaces equivalent to the areas of the openings 59 in the frameworks are exposed for purposes of measurements of the samples.

Obviously gears may be employed instead of belts to rotate these frameworks.

Referring especially to Figs. 2, 2A 5 and 7, the optical system of this invention will be evident. The light source consists of two concentrated filament electric lamps 60, of equal luminous output within commercial limitations mounted in sockets 102. Frames 61 carry transparent filters 62, which may be compounded of several layers, some heat-resisting and some filtering, if so desired. Separate cooling chambers may also be provided for these filters.

At 63 are shown lenses inserted in the front wall of the heat insulating partition surrounding the light source chamber 40. These serve to render parallel the light rays, as indicated in the drawings at 64. A second pair of lenses farther forward 65, serve to converge the light rays to merely fully cover the respective samples, as shown at 66.

These samples mounted in the sample holders may be continuously rotated while being tested, in order to minimize to some degree the effect of surface sheen or gloss, and especially to integrate the effect of varying weave or texture in the samples.

67 represents a testing chamber enclosed on three sides by opaque material, preferably metal, which has been coated on its interior surface with a non-reflecting black pigment, in order that light rays reflected thereunto may be absorbed and not reflected again so as to inadvertently impinge upon the measuring cells of this invention. This chamber is provided in its front wall with two openings which are substantially filled by the samples to be measured. This chamber may be of any convenient shape, and is shown as being a hollow drum open at one end. Since no reflection therefrom is utilized, the conventional spherical form is unnecessary with this invention.

The light rays reflected from the samples are indicated at 68. Both sets of light rays impinge upon a common lens 69, through which they pass, to emerge again in divergent paths, upon the opposite side thereof, as indicated at 70. It is to be noticed by reference to Fig. 2 that the respective sets of light rays are reversed by their passage through lens 69. The emergent light rays are controlled by an adjustable diaphragm 71, preferably of the iris type. This diaphragm is adjusted by means of a mechanical distant control mechanism indicated at 72, 73 and 30. The final adjusting member 30, as already described, operates an indicator upon scale 32.

After leaving the iris diaphragm the light rays again diverge into separate channels and pass through the device indicated at 74. This device is a combination filtering and sample comparison apparatus, adapted for use with liquids or gases. It is indicated in detail in Fig. 2A where the framework 75 carries slots 76 adapted to receive therein a sheet of transparent or translucent filtering material such as indicated at 77. In addition slots 78 are provided for the insertion therein of cells 79. One type of such cell is indicated in Fig. 8, which represents a cell made of transparent material and adapted to receive a liquid therein. Such cell may also be made in a completely enclosed form provided with a suitable stop-cock for the admission and retention of gases therein. Framework 74 also carries a medium opaque partition shown at 80. This partition extends between the individual cells 79 and also continues in a rearward direction and is positioned between the two photo-electric cells indicated at 81. Framework 74 may carry at its rear, as shown, a partition 82 provided with openings 83 directly before the sensitive elements of photo-electric cells 81 mounted in sockets 110, or this partition 82 may be omitted entirely, if so desired.

It is possible to utilize at 77 any suitable filtering material in the form of a solid, or to utilize suitable filtering materials in the form of liquids or gases in cells such as shown at 79. Likewise it is possible to use cells 79 for the comparison of two samples of liquids or gases, in which case both the sample holders which are usually employed for solids should have two samples of a highly reflecting material such as magnesium carbonate employed in both in order to serve as secondary identical light sources in this case. These are preferably but not necessarily identical, as differences can be compensated for in the balanced circuits.

Photo-electric cells 81 may be of any type appropriate to the light to be measured, such as alkali-hydride, caesium oxide, or the like. By the choice of suitable filtering materials in framework 74 it is possible to cause the entire light responsive system to have a band of frequency response suited to the colored samples to be compared. It is also to be understood that such filtering materials employed in framework 74 act in a fashion ancillary to the filters previously indicated at 62.

Partitions 80 and 82 with openings 83 therein serve to prevent each set of light rays from impinging upon the photo-electric cell which properly pertains only to the other set of light rays.

To this end these partitions should be coated upon their surfaces with a light absorbing pigment, preferably black.

Fig. 7A shows the employment of a single light source 200 emitting rays 201 which are rendered parallel by lenses 202. They are reflected from mirrors 203 to form parallel beams 204, equivalent to those produced from a single source. Other optical systems, such as those employing prisms can be obviously employed to effect the same results.

Referring now to Fig. 9 which shows an alternate form of sample holder suited for solids, framework 54' corresponds to framework 54 of the holder shown in Fig. 6, and may be secured to the forward wall of chamber 67 by fastening means extending through openings 84. In place of discs 57 of the sample holders previously described, rotating tubes 85 are employed, driven by belts, as hereinbefore described, operating upon pulleys 86. These tubes are provided with rims 87 at the rear ends thereof.

Referring now to Fig. 10, an auxiliary tube 88 is indicated containing therein a sample of material such as yarn or the like, indicated at 89. This auxiliary tube is of a size suitable to fit snugly within the main tube 85 of the sample holder of Fig. 9, and when so inserted will come to rest against the shoulder or rim 87 thereof. This assures that the yarn or similar material to be tested will occupy a position uniform in both sample holders.

This form of sample holder and auxiliary holder indicated in Figs. 9 and 10 is of utility for the measurement of materials which are not conveniently cut into discs, suitable for insertion in the form of solid sample holders previously described.

Fig. 11 illustrates in a form principally diagrammatic, a form of electrical circuit suitable for use with the mechanical and optical arrangement of parts shown in the previous figures. This circuit as shown is suitable for use with commercial alternating current supplies such as are commonly to be met with in this country. It is understood that details of this circuit may be altered, so as to allow the use of commercial direct current supplies, or the use of current supplied from primary or secondary generators, such as electric batteries, in case that a commercial supply of a fair degree of constancy be not available.

In Fig. 11, 100 indicates a source of electric current supply, 101 the main switch serving to disconnect the entire apparatus from such supply, and 60 the two light sources mounted in bases 102. These light sources are preferably of the type commonly referred to as concentrated filament incandescent lamps, but for special uses may be of other types, such as glow tubes. For purposes of regulation and/or voltage reduction a variable resistance indicated at 103 may be inserted in series with these lamps. 104 indicates another such variable resistance inserted in series with the primary winding 105 of a stepdown transformer 106.

A further extension of the supply voltage is indicated through conductors 107 and the left hand pair of contacts of switch 108 to motor 109 which is indicated as being of the alternating current type, but may, of course, be of any type suitable to the source of electrical energy fed through conductors 107. In case that the source of commercial current available is not of sufficient constancy to allow its employment for light sources 102 or for feeding transformer 106, it may be preferable if the secondary energy source employed be limited in value, that conductors 107 do not connect to switch 101 but connect separately to such commercial power source, since great constancy is not required in the operation of this motor. Switches 101 and 108 may be operated by external control means, such as buttons 28, shown in Fig. 1.

Referring now to the balanced measuring, indicating and amplifying system, there is shown at 81 the two photo-electric cells, deriving their potential from a common supply battery indicated at 111. These cells are coupled by resistances 112 to the input electrodes 113 of amplifier tubes 114. These input electrodes are negatively biased by a source of potential indicated at 115, and employ for purposes of amplifiation the electron stream emitted from cathodes 116, which in turn are activated by electrical heaters 117. These heaters derive their energy from secondary winding 118 of transformer 106. The center or equi-potential point of this winding indicated at 119 is preferably connected to the cathodes of tubes 114 at the point 120, by means of conductor 121. It may be desirable, as well known in the electrical art, to interpose a source of biasing potential in this conductor, although this has usually been found to be unnecessary with commercial tubes available as amplifiers, and is accordingly not indicated in the figures.

The output electrodes 122 of the amplifier tubes are connected through a bridge network of resistances and a voltage control resistance 126' to the anode potential supply 123. The output indicating bridge circuit includes fixed resistances 124 and resistances 125 supplied with variable taps thereon. These taps are connected by means of a circuit closed by the right hand set of contacts of switch 108 to a further resistance network comprising two variable resistances 126 and 127 and a fixed resistance 128 shunting galvanometer 35. Resistance 127 is supplied with a short circuit switch 129.

The variable taps on resistances 125 are controlled by knobs 33, while switch 129 is controlled by knob 34, all of these knobs being situated on the exterior of the apparatus.

Resistance 127 is the "duller" resistance, serving to decrease the over-all sensitivity of the system including galvanometer 35, and is left in the circuit until preliminary adjustments indicate that the current flowing through galvanometer 35 will not be so great as to damage this instrument, as well as to allow the iris diaphragm adjustment as later described in detail or to extend the scope of color measurements to include that of extreme limits, such as black and white. Resistance 128 serves to increase the damping of galvanometer 35, and also somewhat as a protection from excessive currents. In case that a galvanometer is employed which is of a lower sensitivity, or does not require such damping, resistance 128 may be omitted.

Variable resistances 126 and 126' serve as general sensitivity controls for the indicating system, and need not be controlled from the exterior of the apparatus, since a change of adjustment thereof is rarely required, except when measurements of a totally different character or degree of precision are to be made. Voltage control resistance 126' may be sufficient without the employment of resistance 126, which latter may accordingly be omitted.

This sensitivity adjustment may also need to be changed when different light sources or photoelectric cells are substituted. It is to be noted that the branch of the amplifier output circuit which contains the indicating instrument is only in circuit when switch 108 is closed. The closure of this switch simultaneously sets in operation motor 109, and therefore is the last step usually made in setting into operation this apparatus. Consequently galvanometer 35 is only in the circuit for a minimum of time, and therefore its expectant life is increased.

While not confined to any particular values of potentials or resistances, the following are illustrative of values ordinarily used with commercial apparatus. Battery 111 is usually of the order of 100 volts and coupling resistances 112 of the order of 10 megohms each. Battery 115 is usually from 9 to 16 volts, when amplifier tubes 114 are of the commercial type commonly designated 227, or the like, but may be different if other types, such as those with directly heated cathodes are used. Such types of amplifying tubes usually operate at a potential of between 2 and 5 volts. Consequently transformer winding 118 may be of this voltage. Anode supply battery 123 is usually between 90 and 135 volts. Resistances 124 may be 50,000 ohms each and resistances 125 18,000 ohms each, maximum. Sensitivity resistors 126 and 126' may be variable from 0 to 200,000 ohms, and "duller" resistor 127 may have a value of 600,000 ohms. It is to be understood that both voltages and resistances are dependent to a great extent upon the types of photo-electric cells, amplifier tubes, and galvanometer employed.

Since batteries 111, 115 and 123 are interconnected, it is possible in some cases to combine two or more of these batteries into a single unit, either a battery or a rectifier-filter unit, with appropriate tappings for the various desired potentials.

It is preferable that all surfaces passively exposed to the light rays within the apparatus be coated with a black, light absorbing pigment, to avoid undesired reflections therefrom.

The manner of operating this invention is susceptible of wide variation, and many different methods of operation will be apparent to one skilled in the art. Accordingly, when we describe any one method of making measurements, it is to be understood that we are in no wise confined to this precise method.

In general, it is advisable that the iris diaphragm be almost completely closed, before the apparatus is put into operation, unless previous trial has made the operator thereof acquainted with the sensitivity of the photo-electric cells for the samples which are about to be tested. Duller resistance 127 is left in the circuit by putting switch 129 in the open circuit position. The samples are properly placed in position, switch 101 is closed, sensitivity adjustment 126 is put at a sufficient resistance to properly prevent galvanometer 35 from being overloaded, and switch 108 closed. The iris diaphragm and resistances 126' and/or 126 may then be manipulated until a suitable indication is obtained upon the galvanometer. Finally duller switch 129 may be closed, thus allowing a greater degree of sensitivity to be obtained.

After such preliminary adjustments have been made, the iris diaphragm may be adjusted accordingly to the degree of difference between the sample and some standard chosen for purposes of comparison according to the method hereinafter described. This diaphragm permits the light reaching the photo cells to have a constant value, irrespective of the colors being measured, which allows galvanometer 35 to be calibrated in terms of percentage difference between the samples to be compared.

In general, it will be found impossible to secure a perfect balance of both sides of this apparatus for samples which are known to be identical, owing to commercial differences in the light sources, amplifying tubes and photo-electric cells. Accordingly a transposition of the sample and the standard from one side to the other is advisable for purposes of greater precision.

In the case of commercial work, where extreme accuracy may not be needed, it may be found sufficient to merely transpose the electrical circuits from the photo-electric cells onward to the indicator, in place of actually stopping the apparatus and interchanging the actual physical samples. Such transposition of the electrical circuits may be readily accomplished by the use of well known reversing switches, as familiar to those skilled in the art, and may save much time in sampling and matching for certain classes of commercial measurements.

Due to geometrical considerations the usual scales employed with iris diaphragms are of the general square law type. To obtain a more uniform scale on the iris diaphragm control of this invention, a transparent member with opacity varying in degree from the center to the outside, may be employed therewith. A design drawn, painted or photographically produced, may conveniently be used. This design will preferably be darker toward the center and may be inserted adjacent to lens structure 69, upon either side thereof, or adjacent the iris diaphragm.

Another method of securing a more uniform scale is to provide a non-linear mechanical linkage between the diaphragm and its control member, such as a cam having a contour varying non-linearly in such wise as to offset the non-linearity of the actual diaphragm motion.

Of course this linear scale is not essential to the operation of our invention and it may accordingly be of a non-linear type.

In the operation of this device it is to be noted that the light coming from two discrete sources passes through separate channels on its way to the samples. This arrangement of such separate channels before impingement upon the samples allows the convenient employment of filtering apparatus, whereby certain undesired wave lengths of the radiant energy produced by these light sources may be abstracted in a great measure from the light beams which are to be used for the purposes of illumination of the samples. The energy which appears in the form of heat, when these undesired wave lengths are absorbed, can in this fashion be conveniently renewed by air currents produced solely by natural convection.

In previous similar photometric apparatus, the light emitted by a commercial source of high intensity has been allowed to impinge directly upon the sample. This caused, especially when the sample was of a dark hue, the absorption of a large amount of radiant energy by this sample, and its conversion into heat in the body of the sample. Such heat appearance in the sample gave rise to a need for cooling apparatus, usually of an elaborate nature. All readily available commercial sources of light of high intensity emit a beam which contains, as a rule, a much greater amount of energy in such non-visible and consequently non-useful part of their emission spectra, than in the visible portion thereof.

Since such "raw" light contains such a large percentage of undesired heat or infra-red rays, and since the samples to be measured often changed their color, or even underwent chemical decomposition when heated, the necessity consequently arose of employing such cooling system as previously mentioned. These systems entailed an increase in the complexity and cost of manufacture in the color measuring apparatus, which difficulties are avoided by the pre-filtration system of this invention.

By the use of a single lens to direct and focus the light reflected from the samples, this invention is not only enabled to secure a greater light gathering efficiency in a given space for such a lens, than could be conveniently secured by the use of two separate lenses, but it can also employ a single iris diaphragm to control the amount of light ultimately reaching the photo-electric cells.

Since photo-electric cells in general have a certain optimum range of sensitivity, depending upon their type, it is manifestly desirable to be able to readily reduce or increase the amount of light falling thereon, in order that such cells be worked at their point or points of maximum sensitivity.

A system such as employed in our invention may be designed to have a sensitivity many times that of the human eye.

For many reasons it is undesirable to alter the light produced by the light sources themselves, in order to secure the aforementioned adjustment relative to the photo-electric cells. In the first place a control of such light immediately after its production by the two discrete light sources, would entail the employment of two separate adjusting means such as diaphragms. This would mean the precise matching of such diaphragms, and their control with a high degree of precision in order to avoid errors in the resultant measurements, or else would call for rebalancing of the entire apparatus whenever such diaphragms were readjusted, if the diaphragms and their adjusting means were of the ordinary commercial type.

If it were attempted to control the light production of this apparatus by some single electrical means intercalated in the common circuit feeding both lamps, the same difficulties would arise due to the commercial non-uniformity of such lamps. Furthermore, in this case not only the quantity, but also the quality of the light would be altered, owing to the great changes in the spectral distribution of radian energy from a filamentary electric lamp, when the temperature of the filament thereof is altered.

With the single lens and diaphragm, however, of this invention both light beams are acted upon simultaneously and identically by means of a single mechanical movement, and moreover without changing in any fashion the spectral quality of the light. It is possible to separate lens 69 into two optically equivalent sections and put this iris diaphragm between these two sections.

The diaphragm employed to secure this control should preferably bear a scale calibrated according to the galvanometer, in order to more closely keep constant the actual amount of light transmitted through the same.

The use of the iris diaphragm allows the ready employment of many commercially convenient artifices for more readily operating this apparatus semi-automatically or completely automatically.

One mode of procedure which has been found convenient is as follows:

The standard color sample is put on one side, and a pure white sample on the other. The duller switch is opened and the galvanometer adjusted to the extreme left. The samples are reversed and the indication, which is the degree of darkness of the standard, is transferred to the iris diaphragm scale.

The duller switch is closed, restoring the sensitivity. The standard sample and unknown sample are inserted and the galvanometer adjusted to mid-point of its scale. The samples are interchanged and the galvanometer deflection from its mid-point indicates the difference between the two samples.

Other methods and procedures of operation will be apparent to those skilled in the art.

For example, the iris diaphragm may be adjusted until the galvanometer indicates a fixed mark, and the difference of shade then read directly upon a suitably calibrated scale attached to this diaphragm adjustment.

In certain cases it may be desirable to secure additional cooling of the light filtering media employed adjacent the light sources. As one example, it is possible to place another filter substantially identical with that shown at 61 in Fig. 3 filtering devices upon the side of the first lens opposite to that shown in the drawings, at a point such as indicated at 64 of Fig. 3.

Immediately before the photo-electric cells of this invention, there are provided means for the insertion of additional filtering devices. If solids, these filtering devices may consist of sheets of colored glass. If liquids or gases, they may be confined in transparent glass cells.

Samples of solid materials, for instance woven fabrics frequently vary greatly in their respective optical properties, depending upon the direction of weave, sheen, or angle of reflection. To avoid possible differences in the light reflected from the samples of this invention, it is preferable to revolve both samples upon their respective holders, by utilizing the means shown in the drawings for this purpose. Such rotation may be either in a common or in different directions.

No form of the usual spherical light chamber is employed in this invention, but direct reflection of light from the surface of the samples is avoided by allowing the light beams to impinge upon the samples at such an angle that the directly reflected light is not transmitted to the photo-electric cells, but such directly reflected component passes to the absorbing walls of the chamber containing the samples and is absorbed thereby. By suitably changing the angle of the sample holders, however, the directly reflected light can be measured, if so desired, instead of that indirectly reflected.

In connection with the light sources, it is preferable to employ a voltage adjusting device. This is indicated in the drawings by a manually variable resistance. It may be preferable in certain cases, however, to substitute therefor some form of automatic current or voltage control, as well known in the electrical art. This same consideration applies also to the current adjusting resistance shown in series with the transformer of the drawings.

The galvanometer shunt shown in the drawings is not absolutely essential, but if the galvanometer is of sufficient sensitivity it is preferred to maintain this shunt at a suitable value sufficient to produce critical damping of the galvanometer needle and consequently increase the speed with which a reading may be secured.

The sensitivity adjusting resistance rarely needs changing, due to the improved form of iris diaphragm above described. When, however, samples of an extreme hue, either light or dark, are to be compared, or in case that a diffeernt degree of precision is required in the measurements, this adjustment may be employed.

One of the two adjusting dials shown in the drawings may be provided with an extremely fine vernier adjustment, if readings are to be taken to a high degree of precision.

It is possible to utilize the graduated scales of these dials as direct indicators of light intensities, in which case the galvanometer is merely used to indicate when the current in the circuit thereof reaches a certain value as, for instance, zero.

While batteries have been indicated as sources of direct current energy for the photo-electric cells and amplifiers of this invention, it is to be understood that similar sources, such as the well known "B eliminators" may be substituted therefor.

In case that the source of commercial energy available for operation of this device is not alternating current, but continuous current, it is readily understood that the motor shown must be changed to a suitable type, and that direct current apparatus must be substituted for the transformer indicated in the drawings. In this case it may also be possible to secure all the desired continuous current potentials for the light cells and/or amplifiers directly from such commercial source, since the balanced bridge structure of this invention allows considerable fluctuation in such sources, without causing serious error in the ultimate indications obtained therefrom. If line voltages in excess of 200 are available, all batteries may readily be dispensed with, by the use of suitable voltage divider means.

The foregoing invention is susceptible of embodiment in many variations and adaptations for differing commercial problems. For example, fabrics may be of the same color, but may differ from one another in sheen, gloss or finish. Such differences can be noted by this apparatus.

Other uses of this invention include the comparison of temperatures by changes in the colors of heated objects, comparison of printed matter, the comparison of natural objects such as beans, cigars, etc., as well as manufactured products such as poker chips.

This invention also readily detects imperfect spots or foreign matter present upon the surface of a fabric, by virtue of the decreased or increased reflective capacity of such spots or matter.

Further extensions of this invention include the automatic control of commercial processes such as the baking of pastry, by the connection of control apparatus to the indicating apparatus of this invention.

Another use of this invention is to detect the difference of area between openings, which may be done by placing the materials having these openings upon a background of a material of highly different reflective capacity.

When dyes are to be measured, it is possible to dye samples and proceed as already indicated, or solutions of the dyes can be employed in the sample cells, which may thus function simultaneously as samples and as filters.

In special cases, secondary calibration scales to read, for example, in weight of dye to be added to a solution, and the like, may be employed.

Samples may also be compared for translucency, transparency or size of openings by employing them in suitable holders in place of, or in addition to, the filter cells of this apparatus.

Likewise by using filters, samples may be compared solely with regard to the color passing through the filter. In this fashion colors can be analyzed as to their separate components.

The photo-electric cells employed in this invention may be of any suitable commercial form, and their sensitivity may be made to conform to that of a human eye by the employment of suitable filters at the points indicated. It is also possible by the use of such filters to adapt this invention to the measurement of samples with regard to their optical properties corresponding to radiations beyond the visible spectrum, i. e., in the infra-red or ultra-violet portions thereof, or in respect to various artificial illuminants.

Other advantages and adaptations of this invention will be readily apparent to one skilled in the art, and the right to claim other special commercial applications of this invention is hereby reserved.

We claim:

1. A color comparison method including producing discrete light beams, causing them to impinge upon discrete samples of the colors to be compared, causing the discrete beams reflected from said discrete samples to cross one another at substantially a single spot, adjusting the intensity of said beams with a single control at said single spot, separating said beams after said control into further discrete channels, causing the impingement of said finally produced discrete beams upon discrete light sensitive cells, transferring the output of said light sensitive cells to balanced electrical amplifying and indicating bridges, and measuring the unbalance of said bridges.

2. In color comparing apparatus, means for producing a plurality of light beams, means for causing said beams to intersect at a single point, an optical shutter acting simultaneously and equally upon said plurality of light beams at the point where said beams intersect, said shutter having control means graduated in terms of electro-responsive means simultaneously actuated by both said light beams.

3. A color comparator including sources of light, filtering means receiving light from said sources for removing radiant heat from the output of said sources, optical means receiving the light passing through said filtering means for transforming said filtered output into substantially parallel beams, focusing means, receiving the light passing through said optical means, sample holding means substantially in the focal points of said focusing means, and receiving the light passing through said focusing means, light absorbing means at the loci of the directly reflected rays from said sample holding means, and receiving said reflected rays unitary focusing and unitary control means in the path of the indirectly reflected rays, and electro-optical conversion means at the end of the path of said indirectly reflected rays and activated by said rays impinging thereupon.

4. A color comparator comprising two photo-electric cells, a differential indicating circuit connected thereunto, an optical path between said cells and the colors to be compared, constricted at one point, a controlling iris diaphragm at said point of constriction, two color sample holding means, means for the rotation of said sample holders, and two light sources acting respectively upon said sample holders.

5. Light comparing apparatus comprising a cabinet, illuminating sources mounted in the cabinet, an air conduit having located therein said light sources, said conduit having a ventilating opening at the bottom and an outlet at the top, sample holders mounted outside of the conduit and receiving light from said sources, photo-electric cells receiving light reflected from the samples in said holders, an optical system arranged between the light sources and the samples and between the samples and said cells whereby said light is concentrated upon said samples and the light reflected from said samples is concentrated upon said cells, indicating means actuated by said cells and thermal insulating means substantially shielding said sample holders and said photoelectric cells from the heat generated by said light sources.

6. The method of comparing optical reflecting powers which includes producing discrete light beams, projecting them upon discrete surfaces to be compared, causing the discrete beams reflected from said discrete surfaces to cross one another at substantially a single spot, simultaneously adjusting the intensity of said beams at said single spot, separating them again into discrete channels, projecting them upon discrete light sensitive cells, conducting the electrical output of said cells to balanced amplifying and indicating bridge circuits, and measuring the unbalance of said circuits.

7. A light comparator comprising a pair of light sources emitting rays of light, a pair of sample holders receiving said emitted light and reflecting it as two discrete beams, a sample chamber with light absorbent walls confining said light rays, optical means for causing said reflected beams to intersect one another at substantially a single point, a single refractive device acting upon said beams substantially at their point of intersection, a single control diaphragm acting simultaneously and equally upon said reflected beams at said single point, said beams again diverging from one another after their intersection at said single point, and a pair of light sensitive cells individually acted upon by said diverging beams and giving individual electrical responses thereto, whereby said reflected beams are separately measured but simultaneously controlled by said single diaphragm.

8. Color comparison apparatus comprising a plurality of sample holders, a plurality of sources giving forth light to be reflected from the samples, light sensitive cells receiving reflected light from the samples, means for causing substantially all said reflected light to traverse a common point, an adjustable diaphragm located between the sample holders and the light sensitive cells at said common point and indicating means controlled by the light sensitive cells for determining the setting of said diaphragm, said adjustable diaphragm giving single optical control of all said reflected light.

HAROLD HORTON SHELDON.
CHARLES F. LORENZ.